United States Patent [19]
Casey

[11] 3,814,555
[45] June 4, 1974

[54] ROTARY ENGINE GAS SEAL LUBRICATION SYSTEM

[75] Inventor: James M. Casey, Sterling Heights, Mich.

[73] Assignee: General Motors Corporation, Detroit, Mich.

[22] Filed: July 14, 1972

[21] Appl. No.: 271,785

[52] U.S. Cl. .................... 418/99, 418/61, 418/142, 123/8.01
[51] Int. Cl. ............................................. F03c 3/00
[58] Field of Search .............. 418/99, 142; 123/8.01

[56] References Cited
UNITED STATES PATENTS

| | | | |
|---|---|---|---|
| 2,522,824 | 9/1950 | Hicks | 418/99 |
| 3,405,694 | 10/1968 | Zimmermann et al. | 418/142 |
| 3,480,204 | 11/1969 | Harlin | 418/99 |
| 3,649,140 | 3/1972 | Harlin | 418/97 |

*Primary Examiner*—C. J. Husar
*Attorney, Agent, or Firm*—R. L. Phillips

[57] ABSTRACT

A rotary engine having side wall intake ports is provided with oil feed ports that are also located in the side walls past the intake ports in the direction of rotor rotation with the oil feed ports receiving oil at a rate that increases with increasing load and feeding the metered oil for lubrication of the side walls against which the rotor's side and corner seals run against with oil distribution to the engine's internal peripheral wall against which the rotor's apex seals run against being effected by centrifugal force that acts to throw oil radially outward from the side and corner seals against this surface.

3 Claims, 3 Drawing Figures

ROTARY ENGINE GAS SEAL LUBRICATION SYSTEM

This invention relates to a rotary engine gas seal lubrication system and more particularly to a lubrication system for a rotary engine that meters oil to first assure lubrication of the rotor's side and corner seals and thereafter lubrication of the rotor's apex seals.

In presently commercial rotary engines, the rotor's gas seals are lubricated by metering oil at a rate that increases with increasing engine load to the engine's carburetor. The oil is mixed with the fuel and then fed with the air and fuel through the engine's intake porting to the rotor cavity where it must be deposited on the walls to become effective as lubricant for the rotor's gas seals that slide on these walls. I believe that the oil in this mixture is atomized as it is drawn into the engine during the intake phase and randomly distributed throughout the mixture of air and fuel and as a result only a portion of the available oil deposits itself on the cavity walls. The remainder of the oil deposits itself on the rotor's faces or remains in suspension and is burned up in the combustion process. Furthermore, I have found that with such a lubrication system the rotor's seals that engage the rotor cavity's side walls experience a greater degree of wear than the rotor's seals that engage the rotor cavity's peripheral wall as the oil delivery rate is reduced.

The rotary engine gas seal lubrication system according to the present invention is for use in a rotary engine having a planetary rotor with apex seals that slide on the rotor cavity's peripheral wall and side and corner seals that slide on the rotor cavity's side walls. The lubrication system includes an oil metering pump that meters oil at a rate that increases with increasing engine speed and throttle opening and thus with increasing engine load. The metered oil is directed to a pair of oil feed ports that are located opposite each other in the side walls and past the engine's intake porting in the direction of rotor rotation. With this location of the oil feed ports, oil is metered onto the side walls to effect lubrication of the rotor's side and corner seals which run thereagainst and is not wiped into the intake porting and then blown back into the engine's working chambers by the intake air-fuel flow in an atomized state. Thereafter, oil is thrown by centrifugal force to the peripheral wall by the side and corner seals to effect lubrication of the rotor's apex seals which run thereagainst. Thus, the oil feed is biased to favor lubrication of the side and corner seals instead of the apex seals and as a result there is provided a reduction in rotor oil deposits, exhaust emissions and overall oil consumption.

An object of the present invention is to provide a new and improved rotary engine gas seal lubrication system.

Another object is to provide a rotary engine gas seal lubrication system that reduces rotor oil deposits, exhaust emissions and overall oil consumption.

Another object is to provide a rotary engine gas seal lubrication system that biases the amount of lubrication in favor of the rotor's seals which slide on the rotor cavity's side walls.

Another object is to provide a lubrication system for a rotary engine having a pair of feed ports that are located in the rotor cavity's side walls past the engine's intake porting in the direction of rotor rotation to feed oil to lubricate the side walls against which some of the rotor's gas seals run against with oil then being distributed to the rotor cavity's peripheral wall against which the rotor's remaining gas seals run against by centrifugal force by the first mentioned gas seals.

These and other objects of the invention will become more apparent with reference to the following description and drawing in which.

Figure 1:
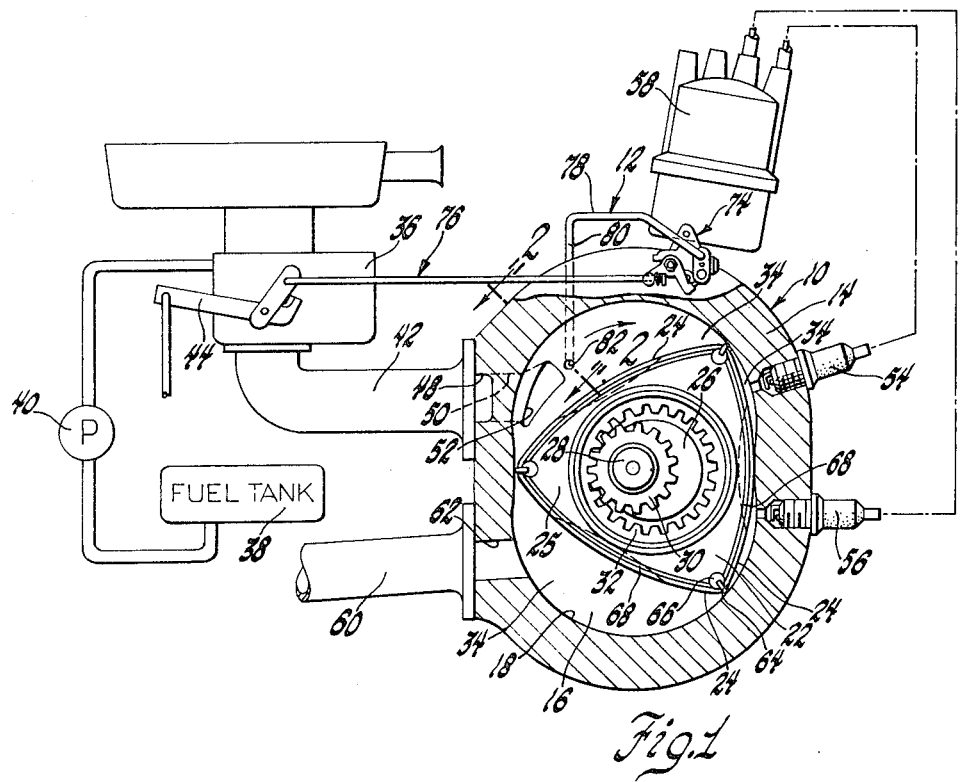
FIG. 1 is an elevational view with parts in section of a rotary engine having a gas seal lubrication system according to the present invention.
Figure 2:
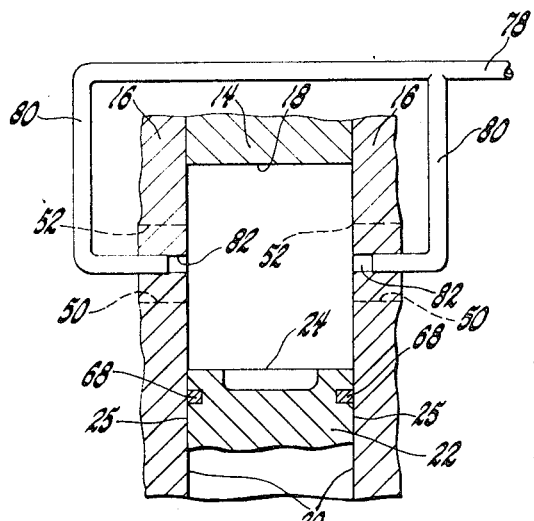
FIG. 2 is an enlarged view of the gas seal lubrication system taken along the line 2—2 in FIG. 1.

Referring to FIG. 1, there is shown a rotary combustion engine 10 having a gas seal lubrication system generally designated at 12 that feeds oil to lubricate the engine's gas seals. The engine 10 has a stationary outer body or engine housing comprising a rotor housing 14 and a pair of side housings 16 that are joined as shown in FIG. 2. The rotor housing 14 has an internal peripheral wall 18 and each of the side housings 16 has an internal side wall 20 spaced apart and facing each other and cooperating with the peripheral wall 18 to define a rotor cavity. The peripheral wall is in the shape of a two-lobed epitrochoid or a curve parallel thereto and a rotor 22 having the general shape of a triangle with three convex peripheral faces 24 and two sides 25 is mounted within the rotor cavity on an eccentric 26 of a crankshaft 28 which is rotatably mounted outboard of the rotor cavity in the side housing 16 and aligned with the rotor cavity's axis. An annular externally toothed gear 30 is received about and is concentric with the crankshaft 28 and is rigidly secured to one of the side housings 16. The gear 30 meshes with an internally toothed gear 32 that is concentric with and fixed to one side 25 of the rotor 22. The gear 32 has 1½ times the number of teeth as the gear 30 with the result that this gearing enforces a fixed cyclic relation between the rotor and the crankshaft such that the crankshaft 28 which is the engine's output makes three complete revolutions for every one complete revolution of the rotor 22. The rotor faces 24 cooperate with the peripheral wall 18 and the side walls 20 to define three variable volume working chambers 34 that are spaced around and move with the rotor within the housing and vary in volume as the rotor rotates about its axis while planetating with respect to the output axis.

A carburetor 36 supplied with fuel from a fuel tank 38 by a fuel pump 40 delivers an air-fuel mixture to an intake manifold 42 under the control of the carburetor's throttle valve whose opening is controlled by a throttle lever 44. The intake manifold 42 is connected to an intake passage 48 in the engine housing that divides into two branches 50 that each pass through one of the side housings 16 and open to the rotor cavity through an intake port 52 in this side housing's side wall 20. The two intake ports 50 are located opposite each other and are arranged so that on rotor rotation in the direction indicated by the arrow in FIG. 1, air-fuel mixture is sequentially periodically admitted to the chambers 34 by the traversing motion of the sides 25 of the rotor 22 relative to the intake ports 52 whereafter the air-fuel mixture is trapped and then compared in readiness for ignition. Sequential ignition of the air-fuel mixture in the chambers 34 is effected by two spark plugs 54 and 56 which are spaced apart about the periphery of rotor housing 14. The spark plugs 54 and 56 receive timed ignition pulses from a distributor 58 driven by the crankshaft 28 and may be fired together or only one plug fired according to certain engine operating conditions as is well known in the art. With combustion, the peripheral wall 18 takes the reaction to force the rotor to continue rotating and eventually each working chamber following the expansion phase, is exhausted during an exhaust phase to an exhaust manifold 60 via an exhaust port 62 that is open to the rotor cavity through the peripheral wall 18 and is traversed by the rotor apexes which effect sequential periodic opening of the chambers to this port.

Sealing of the woking chambers 34 is effected by three apex seals 64 each of which extends the width of the rotor and is mounted at one of the rotor apexes, six corner seals 66 each of which is mounted in one of the rotor sides 25 near one of the rotor apexes, and six side seals 68 each of which is mounted in one of the rotor sides and extends adjacent one of the rotor faces between two of the corner seals with the corner seals each providing a sealing link between adjacent ends of two side seals and one apex seal. The apex seals 64 are urged radially outward by spring means, not shown, to continuously engage the peripheral wall 18 and both the corner seals 66 and side seals 68 on both rotor sides are urged outward by suitable spring means, not shown, to continuously engage the side walls 20. The side seals 68 wipe past the side intake ports 52 to sealingly effect the sequential periodic intake port communication with the working chambers 34 and the apex seals 64 wipe past the peripheral exhaust port 62 to effect sequential periodic connection of the working chambers with the exhaust manifold 60.

Describing now the gas seal lubrication system 12 according to the present invention, there is bolted to the engine housing an oil metering pump 74 of the type disclosed in United States Patent application Ser. No. 266,450, filed June 26, 1972, entitled "Rotary Engine Oil Metering Pump" and assigned to the assignee of the present invention and incorporated herein by reference. The pump 74 is connected by linkage 76 to the carburetor's throttle linkage and is driven from the drive shaft of the distributor 58 and operates to deliver oil to an oil line 78 at a rate which increases with increasing engine speed and throttle opening and thus increases with engine load all as disclosed in detail in the aforementioned US Patent Application Ser. No. 266,450. As shown in FIG. 2, the oil line 78 divides into two branches 80 that are each connected through one of the side housings 16 to open to the rotor cavity through an oil feed port 82 in this side housing's side wall 20. The two oil feed ports 82 are located opposite each other at the same radial and angular locations relative to the crankshaft axis and close to and past the side intake ports 52 in the direction of rotor rotation, their radial location being such that they are traversed or wiped by the side seals 68 during rotor planetation the same as the side wall intake ports 52.

During engine operation oil is delivered at a rate that increases with increasing engine speed and throttle opening to the side wall oil feed ports 82 which feed this oil onto the side walls 20 as the side seals 68 on the two rotor sides 25 sequentially wipe past the oil feed ports 82 after having wiped past the side wall intake ports 52. A major portion of the oil thus delivered is wiped across the side walls 20 by the side seals 68 providing an even distribution of lubricant deposited on the side walls in the path of the side seals 68 and also that of the corner seals 66 for their lubrication while the remainder of the oil is thrown by centrifugal force to the peripheral wall 18 by the side seals 68 and corner seals 66 to lubricate the apex seals 64. Thus, oil at the metered rate is deposited on both the side walls 20 and the peripheral wall 18 with the lubrication system biasing the amount of lubrication to favor the side and corner seals. Furthermore, with the side wall oil feed ports 82 located past the side wall intake ports 52 in the direction of rotor rotation, the oil as it exits from the oil feed ports is prevented from being wiped back into the intake ports and then blown back into the chambers 34 by the intake air-fuel flow in an atomized state. Furthermore, it will be appreciated that while a single pump outlet has been shown to supply both oil feed ports, separate outlets at the pump may be connected to separately feed the two oil feed ports.

Figure 3:
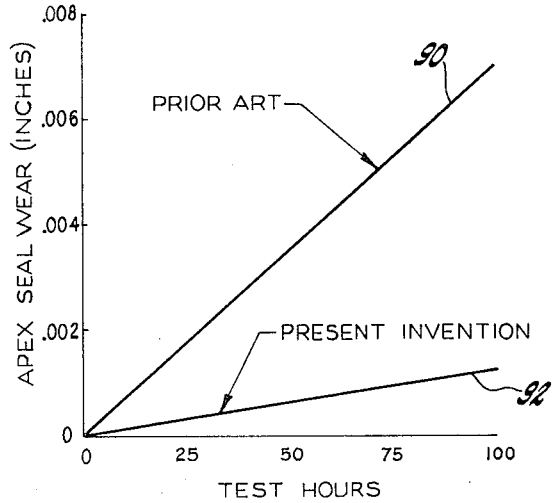
FIG. 3 is a graph showing apex seal wear in a rotary engine having a presently commercial gas seal lubrication system and then the gas seal lubrication system according to the present invention shown in FIGS. 1 and 2.

Certain of the improvements provided by the present invention are illustrated in the graph in FIG. 3 wherein apex seal wear is plotted against test hours on a rotary engine like that shown in FIG. 1 wherein the oil metering pump 74 was connected to meter oil at a normal rate to the carburetor 36 according to present commercial practice and then was connected to meter oil at one-third this normal rate to the oil feed ports 82. On the graph, the line 90 designates the results of the test on the prior art arrangement and shows that apex seal wear increased at a substantially constant rate with approximately 0.007 inch wear occurring after 100 test hours. Then when the same engine was lubricated through the oil feed ports 82 with an oil rate one-thrid that producing the apex seal wear along line 90, there was observed apex seal wear as shown by the line 92 that increased at a substantially constant rate considerably less than the prior art wear rate, the apex seal wear resulting from use of the present invention being only approximately 0.0013 inch after 100 test hours. Thus, these test showed that in comparison with a present commercial lubrication system, use of the present invention resulted in about one-fifth the amount of apex seal wear with one-third the amount of oil delivery rate. Furthermore, these tests also showed that use of the present invention resulted in reduction of side and corner seal wear and also side wall wear.

The above described embodiment is illustrative of the invention which may be modified within the scope of the appended claims.

I claim:
1. A rotary engine comprising a housing having an inner peripheral wall and a pair of opposite inner side walls defining a cavity, a rotor disposed in said cavity having apexes and peripheral faces extending between said apexes opposite said peripheral wall and sides opposite said side walls, an output shaft rotatably supported by said housing having an eccentric rotatably supporting said rotor, means for providing a fixed speed ratio between said rotor and said output shaft whereby said output shaft is caused to rotate as said rotor planetates with a fixed cyclic relationship, said rotor faces and said housing walls cooperatively provid- ing a plurality of working chambers that are peripherally spaced around and move with said rotor within said housing and that vary in volume as said rotor planetates, seal means mounted on said rotor for sealing said chambers, said seal means comprising apex seals each of which is mounted at one of said rotor apexes and sealingly engages said peripheral wall, side seals each of which is mounted in one of said rotor sides and extends adjacent one of said rotor faces between two of said seals and sealingly engages one of said side walls, and corner seals each of which is mounted in one of said rotor sides at one of said rotor apexes and sealingly engages one of said side walls and one of said apex seals and two of said side seals, an intake passage opening to said cavity through a pair of intake ports that are located opposite each other in said side walls in positions to be sequentially periodically opened to said working chambers by traversing motion of said rotor with said side seals wiping over said intake ports as said rotor planetates, an exhaust passage opening to said cavity through an exhaust port that is located in one of said walls in a position to be sequentially periodically opened to said working chambers by traversing motion of said rotor as said rotor planetates, an oil metering pump operable to supply oil at a metered rate, and an oil feed passage connected to receive said metered oil opening to said cavity through a pair of oil feeds ports that are located opposite each other in said side walls in positions inward of the paths of both said corner seals and apex seals and in the path of said side seals to as to be wiped by only said side seals immediately after said side seals wipe past said intake ports whereby said side seals spread the oil delivered by said oil feed ports first on to said side walls.

2. A rotary engine comprising a housing having an inner peripheral wall and a pair of opposite inner side walls defining a cavity, a rotor disposed in said cavity having apexes and peripheral faces extending between said apexes opposite said peripheral wall and sides opposite said side walls, an output shaft rotatably supported by said housing having an eccentric rotatably supporting said rotor, means for providing a fixed speed ratio between said rotor and said output shaft whereby said output shaft is caused to rotate as said rotor planetates with a fixed cyclic relationship, said rotor faces and said housing walls cooperatively providing a plurality of working chambers that are peripherally spaced around and move with said rotor within said housing and that vary in volume as said rotor planetates, seal means mounted on said rotor for sealing said chambers, said seal means comprising apex seals each of which is mounted at one of said rotor apexes and sealingly engages said peripheral wall, side seals each of which is mounted in one of said rotor sides and extends adjacent one of said rotor faces between two of said seals and sealingly engages one of said side walls, and corner seals each of which is mounted in one of said rotor sides at one of said rotor apexes and sealingly engages one of said side walls and one of said apex seals and two of said side seals, an intake passage opening to said cavity through an intake port that is located in one of said walls in a position to be sequentially periodically opened to said working chambers by traversing motion of said rotor as said rotor planetates, an exhaust passage opening to said cavity through an exhaust port that is located in one of said walls in a position to be sequentially periodically opened to said working chambers by traversing motion of said rotor as said rotor planetates, an oil metering pump operable to meter oil at a rate that increases with increasing engine load, and an oil feed passage connected to receive said metered oil opening to said cavity through a pair of oil feed ports that are located opposite each other in said side walls in positions to be wiped by said side seals so that oil delivered to said oil feed ports by said pump is spread by said side seals onto said side walls and is then thrown by centrifugal force onto said peripheral wall by said side seals and said corner seals.

3. A rotary engine comprising a housing having an inner peripheral wall and a pair of opposite inner side walls defining a cavity, a rotor disposed in said cavity having apexes and peripheral faces extending between said apexes opposite said peripheral wall and sides opposite said side walls, an output shaft rotatably supported by said housing having an eccentric rotatably supporting said rotor, means for providing a fixed speed ratio between said rotor and said output shaft whereby said output shaft is caused to rotate as said rotor planetates with a fixed cyclic relationship, said rotor faces and said housing walls cooperatively providing a plurality of working chambers that are peripherally spaced around and move with said rotor within said housing and that vary in volume as said rotor planetates, seal means mounted on said rotor for sealing said chambers, said seal means comprising apex seals each of which is mounted at one of said rotor apexes and sealingly engages said pripehral wall, side seals each of which is mounted in one of said rotor sides and extends adjacent one of said rotor faces between two of said rotor apexes and sealingly engages one of said side walls, and corner seals each of which is mounted in one of said rotor sides at one of said rotor apexes and sealingly engages one of said side walls and one of said apex seals and two of said side seals, an intake passage opening to said cavity through a pair of intake ports that are located opposite each other in said side walls in positions to be simultaneously sequentially periodically opened to said working chambers by traversing motion of said rotor with said side seals wiping over said intake ports as said rotor planetates, an exhaust passage opening to said cavity through an exhaust port that is located in one of said walls in a position to be sequentially periodically opened to said working chambers by traversing motion of said rotor as said rotor planetates, an oil metering pump operable to meter oil at a rate that increases with increasing engine load, and an oil feed passage connected to receive said metered oil opening to said cavity through a pair of oil feed ports that are located opposite each other in said side walls in positions adjacent to and past said intake ports in the direction of rotor rotation so that oil delivered to said oil feed ports by said pump is not wiped into said intake ports and is spread by said side seals onto said side walls and is then thrown by centrifugal force onto said peripheral wall by said side seals and said corner seals.

* * * * *

PO-1050
(5/69)

UNITED STATES PATENT OFFICE
CERTIFICATE OF CORRECTION

Patent No. 3,814,555           Dated June 4, 1974

Inventor(s) James M. Casey

It is certified that error appears in the above-identified patent and that said Letters Patent are hereby corrected as shown below:

Column 5, line 30, "to" should read -- so --.

Signed and sealed this '2th day of November '974.

(SEAL)
Attest:

McCOY M. GIBSON JR.
Attesting Officer

C. MARSHALL DANN
Commissioner of Patents